US009798431B2

(12) United States Patent
Xie et al.

(10) Patent No.: US 9,798,431 B2
(45) Date of Patent: Oct. 24, 2017

(54) TOUCH ELECTRODE STRUCTURE AND TOUCH PANEL USING THE SAME

(71) Applicant: TPK Touch Solutions (Xiamen) Inc., Xiamen (CN)

(72) Inventors: Yanjun Xie, Wuhan (CN); Yau-Chen Jiang, Hsinchu (TW); Xiaoxin Bai, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 19 days.

(21) Appl. No.: 14/820,578

(22) Filed: Aug. 7, 2015

(65) Prior Publication Data

US 2016/0041638 A1 Feb. 11, 2016

(30) Foreign Application Priority Data

Aug. 8, 2014 (CN) .......................... 2014 1 0389181

(51) Int. Cl.
*G06F 3/044* (2006.01)

(52) U.S. Cl.
CPC .................................... *G06F 3/044* (2013.01)

(58) Field of Classification Search
CPC ....................................................... G06F 3/044
See application file for complete search history.

(56) References Cited

U.S. PATENT DOCUMENTS

| 7,821,502 | B2 * | 10/2010 | Hristov | G06F 3/0416 178/18.06 |
| 8,223,133 | B2 * | 7/2012 | Hristov | G06F 3/0416 178/18.06 |
| 8,502,796 | B1 * | 8/2013 | Yilmaz | G06F 3/044 178/18.06 |
| 8,593,424 | B2 * | 11/2013 | Hristov | G06F 3/0416 178/18.06 |
| 8,754,662 | B1 * | 6/2014 | Weng | G01R 27/2605 324/686 |
| 8,975,526 | B2 * | 3/2015 | Jiang | G06F 3/041 174/253 |
| 9,081,453 | B2 * | 7/2015 | Bulea | G06F 3/044 |
| 9,081,457 | B2 * | 7/2015 | Solven | G06F 3/044 |
| 9,182,861 | B2 * | 11/2015 | Bulea | G06F 3/044 |
| 9,335,851 | B2 * | 5/2016 | Jiang | G06F 3/041 |
| 9,389,719 | B2 * | 7/2016 | Li | G06F 3/0412 |
| 2007/0008299 | A1 * | 1/2007 | Hristov | G06F 3/0416 345/173 |
| 2010/0134422 | A1 * | 6/2010 | Borras | G06F 3/044 345/173 |

(Continued)

*Primary Examiner* — Patrick F Marinelli
(74) *Attorney, Agent, or Firm* — Paul Bendemire

(57) ABSTRACT

A touch electrode structure for defining position units includes electrodes electrically insulated from each other, in which each of the electrodes includes sub-electrodes electrically insulated from each other. Each of the sub-electrodes include sub-electrode units electrically connected to each other, in which each of the position unit is defined by the two sub-electrode units respectively belonging to the different sub-electrodes. The sub-electrode units in one of the position units of each of the electrodes have a combination corresponding to the sub-electrodes arranged therein, and each of the combinations is different from the other combinations in the each of the electrodes.

20 Claims, 6 Drawing Sheets

(56) References Cited

U.S. PATENT DOCUMENTS

| | | | |
|---|---|---|---|
| 2012/0098784 A1* | 4/2012 | Kim | G06F 3/044 345/174 |
| 2012/0113021 A1* | 5/2012 | Liu | G06F 3/041 345/173 |
| 2013/0082719 A1* | 4/2013 | Prendergast | G06F 3/044 324/658 |
| 2013/0307793 A1* | 11/2013 | Song | G06F 3/044 345/173 |
| 2014/0022186 A1* | 1/2014 | Hong | G06F 3/0416 345/173 |
| 2014/0022202 A1* | 1/2014 | Badaye | G06F 3/044 345/174 |
| 2014/0071065 A1* | 3/2014 | Kung | G06F 3/041 345/173 |
| 2014/0071356 A1* | 3/2014 | Petcavich | G06F 3/044 349/12 |
| 2014/0116756 A1* | 5/2014 | Jiang | G06F 3/041 174/253 |
| 2014/0300577 A1* | 10/2014 | Hotelling | G06F 3/0416 345/174 |
| 2014/0354301 A1* | 12/2014 | Trend | G06F 3/044 324/658 |
| 2015/0060255 A1* | 3/2015 | Chen | H03K 17/9622 200/5 R |
| 2015/0062093 A1* | 3/2015 | Ksondzyk | G01N 27/22 345/178 |
| 2015/0062465 A1* | 3/2015 | Her | G06F 3/045 349/12 |
| 2015/0084903 A1* | 3/2015 | Tai | G06F 3/044 345/173 |
| 2015/0116265 A1* | 4/2015 | Xie | G06F 3/044 345/174 |
| 2015/0116610 A1* | 4/2015 | Jiang | G06F 3/041 349/12 |
| 2015/0177876 A1* | 6/2015 | Ishii | G06F 3/044 345/174 |
| 2015/0199055 A1* | 7/2015 | Prendergast | G06F 3/044 345/174 |
| 2015/0205424 A1* | 7/2015 | Park | G06F 3/0414 345/174 |
| 2015/0220181 A1* | 8/2015 | Jung | G06F 3/044 345/174 |
| 2015/0227233 A1* | 8/2015 | Yi | G06F 3/0416 345/174 |
| 2015/0277639 A1* | 10/2015 | Li | G06F 3/0412 345/173 |
| 2015/0378474 A1* | 12/2015 | Liu | G06F 3/0412 345/174 |
| 2015/0378481 A1* | 12/2015 | Cok | G06F 3/044 345/173 |
| 2016/0041638 A1* | 2/2016 | Xie | G06F 3/041 345/173 |
| 2016/0054754 A1* | 2/2016 | Aubauer | G06F 1/16 345/174 |
| 2016/0098113 A1* | 4/2016 | Ding | G06F 3/044 345/174 |
| 2016/0103526 A1* | 4/2016 | Sohn | G06F 3/044 345/174 |
| 2016/0154517 A1* | 6/2016 | Ullmann | G06F 3/044 345/173 |
| 2016/0239146 A1* | 8/2016 | Hu | G06F 3/0416 |

\* cited by examiner

TOUCH ELECTRODE STRUCTURE AND TOUCH PANEL USING THE SAME

BACKGROUND OF THE INVENTION

This application claims priority to China Application Serial Number 201410389181.1, filed Aug. 8, 2014, which is herein incorporated by reference.

Technical Field

The present disclosure relates to touch techniques. More particularly, the present disclosure relates to touch electrode structures and touch panels using the same.

Description of Related Art

In the current market of consumer electronics products, displays with a touch function, e.g., touch panels, have become a mainstream in portable electronic products, such as smartphones, mobile phones, tablets and laptops. Since a user can directly perform a touch operation and instructions through an object displayed on a screen of the touch panel, the touch panel provides a friendly interface between the user and the electronic products.

Typically, the touch panel includes a touch area and a peripheral area around the touch area. The touch area is configured to generate sensing signals, and peripheral signal lines disposed within the peripheral area are configured to transmit the sensing signals to a signal processor for computing, thereby determining coordinates of where the touch operation is performed.

Concerning a typical electrode structure, FIG. 1 is a schematic diagram illustrating a configuration of an electrode structure of a touch panel 100. As shown in FIG. 1, a touch electrode pattern 104 is formed within a touch area 102 of a touch panel 100. The touch electrode pattern 104 includes horizontal electrodes 104a and vertical electrodes 104b, in which each of the horizontal electrodes 104a and each of the vertical electrodes 104b are formed by being connected by electrode units 104c. In this configuration, jumpers 106 are used in the configuration of the touch electrode pattern 104 to connect the horizontal electrodes 104a, so as to prevent the horizontal electrodes 104a and the vertical electrodes 104b from contacting each other. Moreover, an insulating layer 108 is configured to prevent the horizontal electrodes 104a and the vertical electrodes 104b from contacting each other.

However, a number of lithographic processes are required to manufacture the jumpers and the insulating layer on the touch panel, and the manufacturing processes are complex. Moreover, if one of the jumpers fails, such as a jumper breaking or encountering electrostatic discharge, the entire electrode fails.

SUMMARY OF THE INVENTION

An aspect of the present disclosure provides a touch electrode structure. In the touch electrode structure, electrodes can be separated from each other without disposing a jumper and an insulating layer, thereby achieving the effects of simplifying manufacture process and improving yield.

An aspect of the present disclosure provides a touch electrode structure for defining position units. The touch electrode structure includes electrodes electrically insulated from each other, in which each of the electrodes includes sub-electrodes electrically insulated from each other. Each of the sub-electrodes include sub-electrode units electrically connected to each other, in which each of the position unit is defined by the two sub-electrode units respectively belonging to the different sub-electrodes. The sub-electrode units in one of the position units of each of the electrodes have a combination corresponding to the sub-electrodes arranged therein, and each of the combinations is different from the other combinations in the each of the electrodes.

An aspect of the present disclosure provides a touch panel. The touch panel includes a substrate and a touch electrode structure disposed on the substrate.

In the touch electrode structure of the present disclosure, since each of the position units is corresponding to the different combination of the sub-electrode units of the sub-electrodes, each of the position units has an individual and unique identity. That is, each of the position units uniquely corresponds to the different combination of the sub-electrode units of the sub-electrodes, and hence determining where the touch operation is performed can be achieved.

BRIEF DESCRIPTION OF THE DRAWINGS

The disclosure can be more fully understood by reading the following detailed description of the embodiment, with reference made to the accompanying drawings as follows.

DETAILED DESCRIPTION OF THE INVENTION

Figure 1:
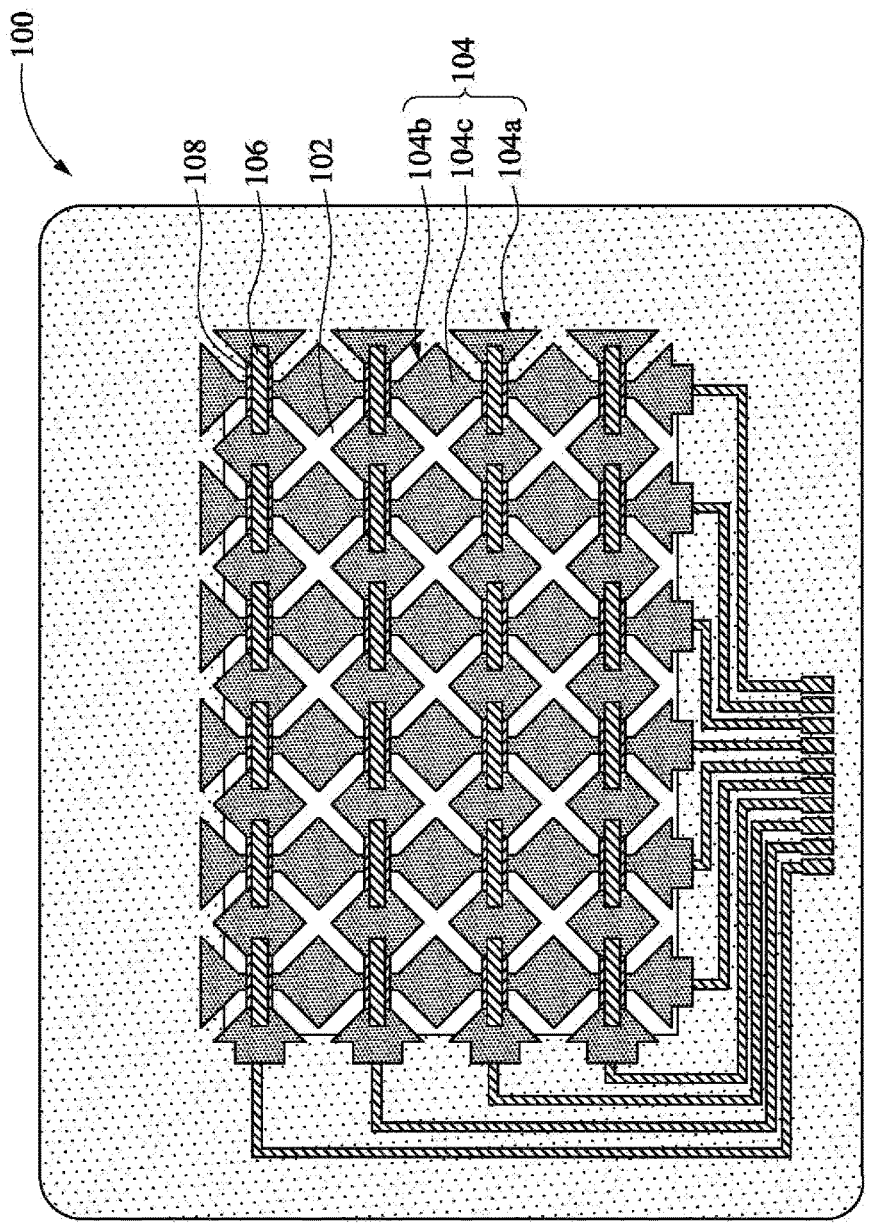
FIG. 1 is a schematic diagram illustrating a configuration of an electrode structure of a touch panel.

Reference will now be made in detail to various embodiments, examples of which are illustrated in the accompanying drawings. Wherever possible, like reference numerals are used in the drawings and the description to refer to the same or like parts.

A touch panel of the present disclosure includes position units taken as sensing units, and sub-electrode units corresponding to the position units have different combinations. Therefore, a system can determine where a touch operation occurs according to variation of sensing signals of sub-electrodes.

Figure 2:
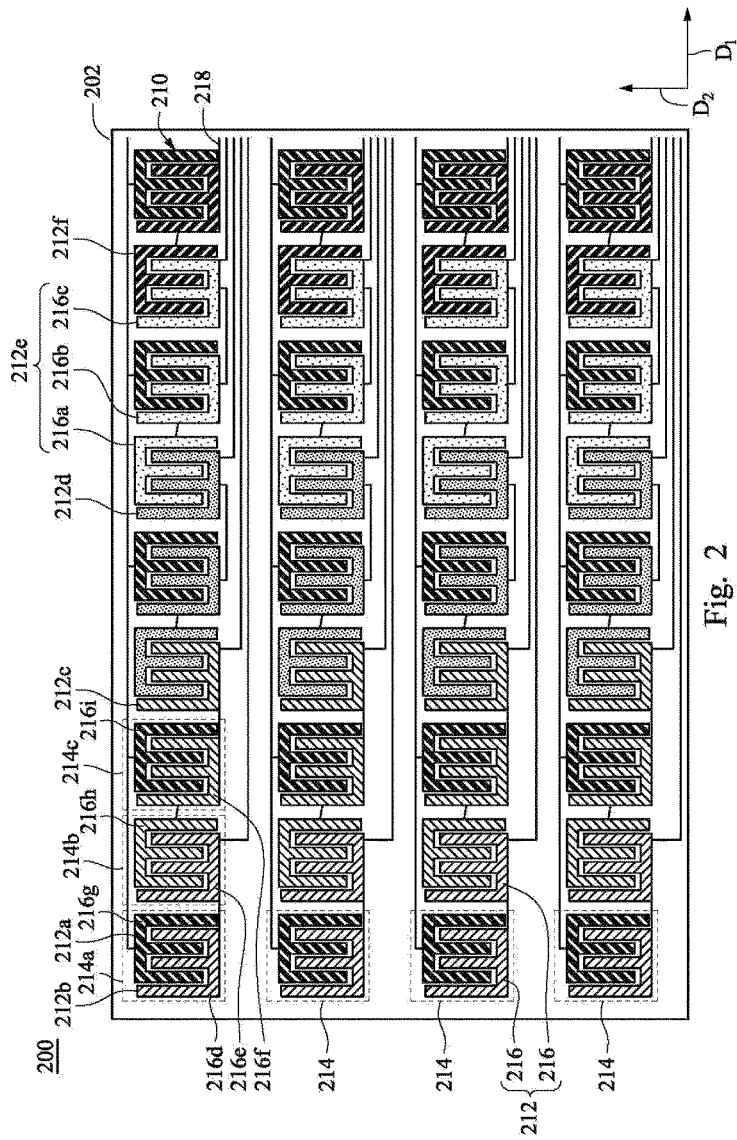
FIG. 2 is a schematic top view of a touch panel according to one embodiment of this disclosure.

FIG. 2 is a schematic top view of a touch panel according to some embodiments of this disclosure. An aspect of the present disclosure provides a touch panel 200 including a substrate 202 and electrodes 210, in which the electrodes electrically insulated from each other are disposed on the substrate 202 to form a touch electrode structure.

The substrate 202 is used for carrying and protecting the elements disposed on the substrate 202. In addition, in some embodiments, the substrate 202 is a cover glass, and a surface opposite the surface where the electrodes are disposed can be taken as a touch surface for a user.

The substrate 202 may be made of a hard material or a flexible transparent insulating material, for example, reinforced glass (Reinforced cover), sapphire glass, polyimide (PI), polypropylene (PP), polystyrene (PS), acrylonitrile-butadiene-styrene (ABS), polyethylene terephthalate (PET), polyvinyl chloride (PVC), polycarbonate (PC), polyethylene (PE), polymethyl methacrylate (PMMA), or polytetrafluoroethylene (PTFE).

The electrodes 210 are extended along a first direction D1 and arranged to be parallel to each other. In some embodiments, the electrodes 210 are made of transparent conductive material, for example, indium tin oxide (ITO), indium zinc oxide (IZO), carbon nanotubes (CNT), or nano-silver, and the electrodes 210 with the transparent conductive material are formed on the substrate 202 by printing, photolithography etching, or laser etching.

According to some embodiments of the present disclosure, each of the electrodes 210 is formed by sub-electrodes 212, the sub-electrodes 212 are electrically insulated from each other. Six such sub-electrodes 212a-212f are illustrated in FIG. 2.

Each of the sub-electrodes 212 includes sub-electrode units 216. For example, the sub-electrodes 212e are formed by the three sub-electrode units 216a-216c electrically connecting to each other along the first direction D1. The sub-electrode units 216a-216c can be connected to each other by transparent wires or opaque wires. That is, the wires may be made of the same transparent conductive material as the sub-electrode units 216a-216c or metal, in which the metal includes copper, molybdenum, or aluminum. In addition, a route 218 is disposed at each of the sub-electrodes 212, in which each of the sub-electrodes 212 is connected to a controller (not illustrated) by the route 218.

Position units 214 are defined on the substrate 202, in which each of the position units 214 can be taken as a minimum sensitive unit in the touch panel 200. All of the position units 214 can be arranged as an array together to form a touch area of the touch panel 200.

Each of the position units 214 is defined by the two sub-electrode units 216. The two sub-electrode units 216 in or corresponding to each of the position units 214 have a combination, and each of the combinations is different from the other of the combinations. Each of the combinations is arranged by the two sub-electrode units 216, which respectively belong to the different sub-electrodes 212. The descriptions below are provided with respect to the detail about the combinations with three different position units 214a, 214b, 214c illustrated in FIG. 2.

Since each of the position units 214 is defined by the two sub-electrode units 216, there are two sub-electrode units 216 within each of the position units 214. Furthermore, "the sub-electrode unit 216 in the position unit 214" herein means that the sub-electrode unit 216 is located within the position unit 214.

In the position unit 214a, there are two different sub-electrode units 216d and 216g within the position unit 214a, in which the sub-electrode units 216d and 216g respectively belong to the sub-electrodes 212b and 212a.

In the position unit 214b, there are two different sub-electrode units 216e and 216h within the position unit 214b, in which the sub-electrode units 216e and 216h respectively belong to the sub-electrodes 212b and 212c.

In the position unit 214c, there are two different sub-electrode units 216f and 216i within the position unit 214c, in which the sub-electrode units 216f and 216i respectively belong to the sub-electrodes 212c and 212a.

Furthermore, the sub-electrode units 216 in each of the position units 214 are arranged along a second direction D2, in which the first direction D1 and the second direction D2 are orthogonal.

According to some embodiments of the present disclosure, each of the sub-electrode units 216 has three parallel electrode patterns electrically connected to each other and arranged along the first direction D1, in which openings are located between the adjacent electrode patterns, as shown in FIG. 2. Each of the sub-electrode units 216 is comb-shaped. In each of the position units 214, the electrodes patterns of the two sub-electrode units 216 are respectively inserted into each other through the corresponding openings. For example, in the position unit 214a, the electrode patterns of the sub-electrode unit 216d are located in the openings of the sub-electrode unit 216g, and the electrode patters of the sub-electrode unit 216g are located in the openings of the sub-electrode unit 216d. Therefore, an area of the position unit 214a is equal to a total area of the corresponding sub-electrode units 216d and 216h.

With this configuration, since the sub-electrode units 216 can generate the mutual capacitance (or coupling capacitance) with the greater area, the touch panel 200 has better sensitivity. However, a person having ordinary skill in the art may choose a proper shape of the electrode patterns of the sub-electrode units 216. For example, the shape of the electrode patterns of the sub-electrode units 216 in the present embodiment is rectangular, while the shape of the electrode patterns may be triangular or the other shapes in the other embodiments.

In some embodiments, since each of the position units 214 corresponds to a different combination of the sub-electrode units 216 of the sub-electrodes 212, each of the position units 214 has an individual and unique identity. That is, each of the position units 214 uniquely corresponds to a different combination of sub-electrode units of the sub-electrodes, and hence determining where the touch operation is performed can be achieved. The following descriptions and the drawings are provided with respect to achieve the effect of determining where the touch operation is performed.

Figures 3A, 3B:
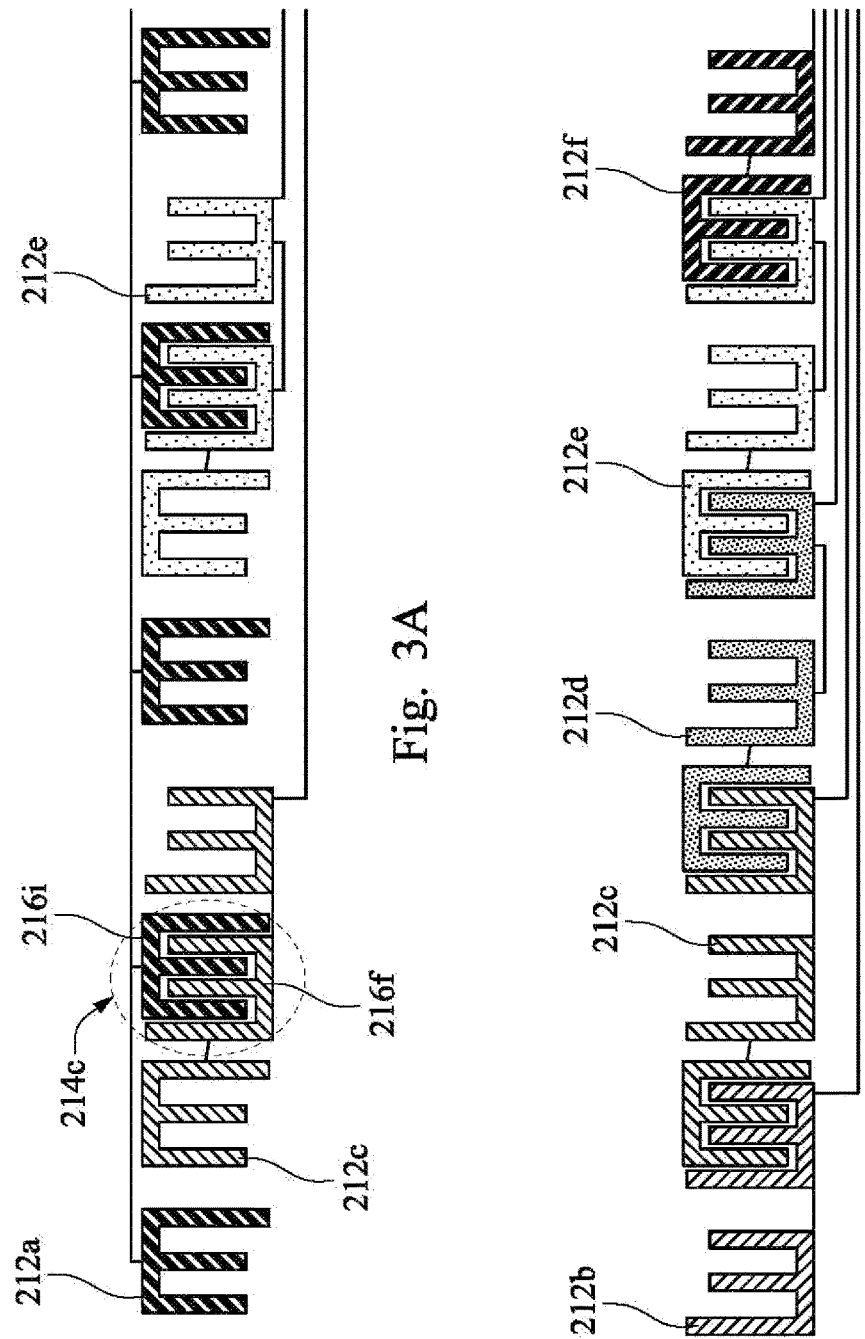
FIG. 3A is a schematic top view of determining where a touch operation is performed on a touch panel according to some embodiments of this disclosure.
FIG. 3B is a schematic top view of determining where a touch operation is performed on a touch panel according to the other some embodiments of this disclosure.

FIG. 3A is a schematic top view of determining where a touch operation is performed on a touch panel according to at least one embodiment of this disclosure. For example, when user's finger or an object performs a touch operation or moves near the position unit 214c on the substrate, an electrical signal (for example, voltage or current caused by the mutual capacitance) in the position unit 214c may be changed. Since the sub-electrode unit 216f of the sub-electrode 212c and the sub-electrode unit 216i of the sub-electrode 212a are within the position unit 214c, sensing signals outputted by the sub-electrodes 212a and 212c may be changed due to the changed electrical signal.

On the other hand, the sensing signals outputted by the other sub-electrodes 212 are not affected. Alternatively stated, compare with the sensing signals outputted by the sub-electrodes 212a and 212c, the variation of sensing signals outputted by the other sub-electrodes 212 is smaller. Moreover, since the combination of the sub-electrodes 212a and 212c is uniquely corresponding to one of the position units 214 (the position unit 214c), a system (or the controller) can define where the touch operation is performed by the sensing signals outputted by the specific sub-electrodes 212. In addition, the definition of the system may be set according to the variation of the changed sensing signals.

As shown in FIG. 3A, when a driving signal is outputted to the sub-electrode 212a, the sub-electrodes 212c and 212e can be respectively scanned. In other words, the sub-electrode 212a can be taken as a transmitter electrode (Tx), and the sub-electrodes 212c and 212c can be taken as receiver electrodes (Rx). The sensing signals outputted by the two sub-electrodes 212 changing indicates that the touch operation occurs at the position unit 214 corresponding to the two sub-electrode units 216 respectively belonging to these two sub-electrodes 212.

FIG. 3B is a schematic top view illustrating determining where a touch operation is performed on a touch panel according to various embodiments of this disclosure. The same detection described above is performed in the illustration of FIG. 3B, while the sub-electrodes 212b, 212d, and 212f are taken as the transmitter electrodes (Tx) and the sub-electrodes 212c and 212e are taken as the receiver electrodes (Rx). Similarly, the transmitter electrodes and the receiver electrodes are respectively configured to receive the driving signals and scan, thereby performing the touch position detection. In other embodiments, the sub-electrodes 212c and 212e are taken as the transmitter electrodes (Tx) and the sub-electrodes 212b, 212d, and 212f are taken as the receiver electrodes (Rx).

As a result, with the determining mechanism given by the detection described above, under the condition that the combinations of the sub-electrode units 216 in the position units 214 are different respectively (different form each other), the system can determine which of the position units 214 is touched through the variations of the sensing signals outputted by the sub-electrodes 212.

Referring back to FIG. 2, in the electrode 210 formed by the six sub-electrodes 212a~212f illustrated in FIG. 2, the sub-electrodes 212 have three types. The first type is similar to the sub-electrode 212a. For example, the sub-electrode units 216 of the sub-electrode 212a have an arrangement rule that the sub-electrode units 216 of the sub-electrode 212a are arranged with an arranging cycle, in which the arranging cycle is that the adjacent sub-electrode units 216 are spaced out by one position unit 214 therebetween. The second type is similar to the sub-electrodes 212b and 212f. The sub-electrodes 212b and 212f are respectively located at the first position (illustrated at the leftmost side in FIG. 2) and the last position (illustrated at the rightmost side in FIG. 2) of the electrodes 210, and each of the sub-electrodes 212b and 212f has two sub-electrode units 216. The third type is similar to the sub-electrodes 212c-212e. Each of the sub-electrodes 212c-212e has three sub-electrode units 216.

According to different designs, the number of the position units 214 in the electrodes 210 can be increased by disposing more sub-electrodes 212 of the third type (the sub-electrodes 212c-212e in FIG. 2), and therefore the number of the combinations of the sub-electrode units 216 is correspondingly increased. Correspondingly, the length of the sub-electrodes 212 of the first type (the sub-electrode 212a in FIG. 2) can be lengthened according to the length of the electrode 210, and the arrangement rule is kept the same. The sub-electrodes 212 of the second type (the sub-electrodes 212b and 212f in FIG. 2) are still respectively disposed at the first position and the last position of the electrodes 210.

As previously described, in the touch panel 200 of the present disclosure, the different combinations of the sub-electrode units 216 of the sub-electrodes 212 are configured to correspond to the different position units with the touch operation. In a conventional touch panel, each of the position units needs to be connected to a controller through a route individually. In the touch panel 200 of the present disclosure, the number of the routes 218 connected to the controller is decreased. Therefore, since the area occupied by the routes can be reduced, the touch panel is suitable for a structure with a narrow frame.

In some embodiments, the routes 218 of the touch panel 200 are led toward one side, and hence all of the routes 218 of the touch panel 200 are led along the same direction. However, in some embodiments, the routes 218 of the touch panel 200 are led to two sides.

Figure 4:
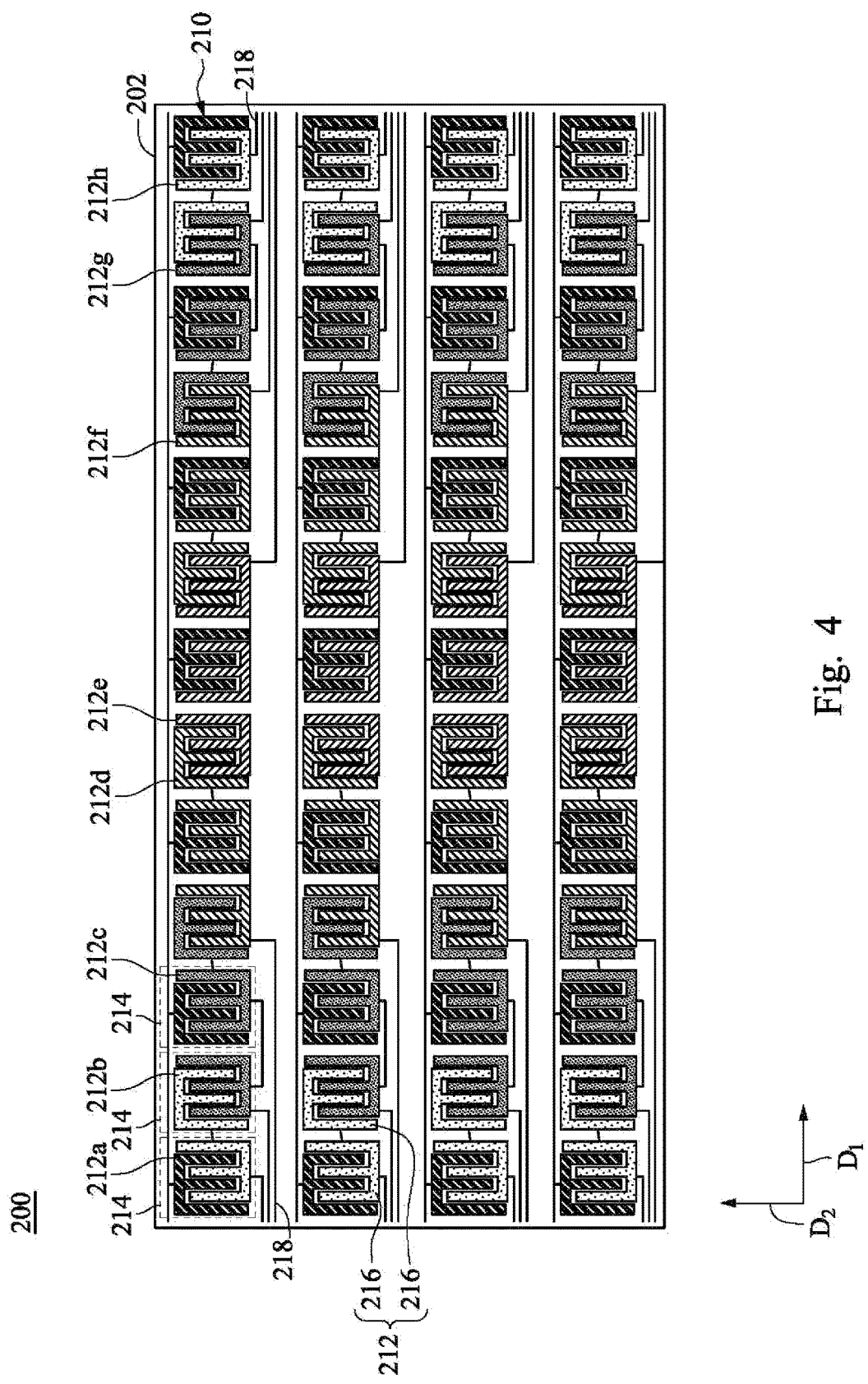
FIG. 4 is a schematic top view of a touch panel according to the other some embodiments of this disclosure.

FIG. 4 is a schematic top view of a touch panel according to various embodiments of this disclosure. In some embodiments, a touch panel 200 includes a substrate 202 and electrodes 210. Position units 214 are defined on the substrate 202, and the electrodes 210 electrically insulated from each other are disposed on the substrate 202.

The electrodes 210 extended along a first direction D1 are parallel to each other, and each of the electrodes 210 is formed by sub-electrodes 212 electrically insulated from each other.

Each of the sub-electrodes 212 has sub-electrode units 216 and a route 218. The routes 218 of a portion of the sub-electrodes 212 are routed toward a direction and the routes 218 of the other portion of the sub-electrodes 212 are routed toward another direction. For example, as shown in FIG. 4, the routes 218 of the sub-electrodes 212 are respectively led toward two sides of the substrate 202.

Each of the position units 214 is defined by the two sub-electrode units 216. As previously described, the combinations of the sub-electrode units 216 within the position unit 214 are different (different from each other), and each of the combinations is arranged by the sub-electrode units 216, which respectively belong to the different sub-electrodes 212.

In some embodiments, since each of the position units 214 in the one electrode 210 still corresponds to the different combination of the sub-electrode units 216 of the sub-electrodes 212, each of the position units 214 has an individual and unique identity. That is, each of the position units 214 can still uniquely correspond to the different combination of the sub-electrode units 216 of the sub-electrodes 212, and hence determining where the touch operation is performed is achieved. The combinations arranged by the sub-electrode units 216 of the sub-electrodes 212 corresponding to the position units 214 and the touch position detection within the position units 214 are described with regard to the foregoing embodiments, and hence the description will not be repeated here.

As shown in FIG. 4, each of the electrodes 210 is formed by the eight sub-electrodes 212, in which the sub-electrodes 212 have four types. The first type is similar to the sub-electrode 212a. The sub-electrode units 216 of the sub-electrode 212a have an arrangement rule that the sub-electrode units 216 of the sub-electrode 212a are arranged with an arranging cycle, in which the arranging cycle is that the adjacent sub-electrode units 216 are spaced out by one position unit 214 therebetween. The second type is similar to the sub-electrodes 212b and 212h. The sub-electrodes 212b and 212h are respectively located at the first position and the last position of the electrodes 210, and each of the sub-electrodes 212b and 212h has two sub-electrode units 216. The third type is similar to the sub-electrode 212e. The sub-electrode 212e including three sub-electrode units 216 is located at the middle of the electrodes 210. The fourth type is similar to the sub-electrodes 212c-212g. The sub-electrodes 212c-212g are respectively located between the sub-electrode 212b at the first position and the sub-electrode 212e and between the sub-electrode 212h at the last position and the sub-electrode 212e, and each of the sub-electrodes 212c-212g has three sub-electrode units 216.

The sub-electrode 212e located at the middle of the electrodes 210 can be taken as a reference. The routes 218 of the sub-electrode 212e and the sub-electrode 212 located at the right side of the sub-electrode 212e are routed toward the right side. The routes 218 of the sub-electrode 212 located at the left side of the sub-electrode 212e are routed toward the left side. Therefore, in this configuration, the ratio of the routes 218 routed toward the left side and the routes 218 routed toward the right side is substantially 1 to 1.

However, a person having ordinary skill in the art may take a different sub-electrode 212 as the reference to adjust the routing direction of the routes 218 or the ratio of the routes 218 routed toward the right side to the left side.

According to different configurations, number of the position units 214 in the electrodes 210 can be increased by disposing more sub-electrodes 212 of the fourth type (the sub-electrodes 212c~212g in FIG. 4), and therefore the number of the combinations of the sub-electrode units 216 is correspondingly increased. Correspondingly, the length of the sub-electrodes 212 with the first type (the sub-electrode 212f in FIG. 4) can be lengthened according to the length of the electrode 210, and the arrangement rule is kept the same. The sub-electrodes 212 with the second type (the sub-electrodes 212b and 212h in FIG. 4) are still respectively disposed at the first position and the last position of the electrodes 210.

In the touch panel 200 of the present disclosure, the different combinations of the sub-electrode units 216 of the sub-electrodes 212 are configured to correspond to the different position units with the touch operation. In a conventional touch panel, each of the position units needs to be connected to a controller through a route individually. In the touch panel 200 of the present disclosure, the number of the routes 218 connected to the controller is decreased, such that the area occupied by the routes is reduced and the touch panel can be suitable for a structure with a narrow frame. Moreover, by routing the routes to the two sides, the capacity of the substrate 202 can be utilized effectively.

With the above embodiments, the number of the position units 214 in each of the electrode 210 is defined by the number of the sub-electrodes 212 forming the same electrode 212. Moreover, the number of the position units 214 can be increased through increasing the number of the sub-electrodes 212, so as to make touch panels having different physical dimensions.

In the touch panel 200 and the touch electrode structure of the present disclosure, since the sub-electrodes 212 of each of the electrodes 210 do not intersect each other, each of the electrodes 210 can be formed by the sub-electrodes 212 without jumpers in the circuit design. Therefore, the touch electrode structure can be formed by patterning a single conductive layer. This circuit configuration can be designed simply, and the number of manufacturing process steps is decreased. Therefore, the reliability of the manufacturing process is improved, and the problems of frequent jumper breaking and electrostatic discharge are prevented.

Figure 5:
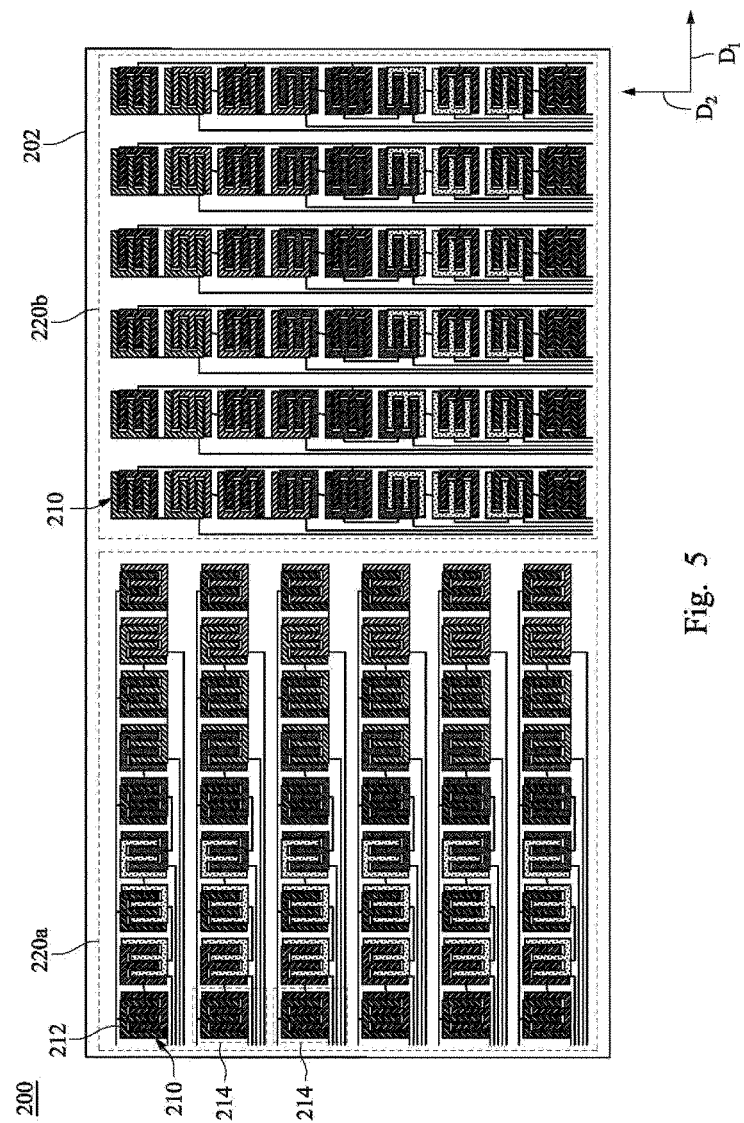
FIG. 5 is a schematic top view of touch zones according to some embodiments of this disclosure.

FIG. 5 is a schematic top view of touch zones according to some embodiments of this disclosure. In order to make the touch panel 200 suitable for a large-dimension design, two electrode zones 220a-220b can be defined on the substrate 202 to respectively dispose two touch electrode structures. In some embodiments, the electrodes 210 in the two touch electrode structures are respectively extended in different directions. For example, the electrodes 210 disposed in the electrode zone 220a are extended in the first direction D1 and the electrodes 210 disposed in the electrode zone 220b are extended in the second direction D2, in which the first direction D1 and the second direction D2 are orthogonal.

According to some embodiments of the present disclosure, the number of the position units 214 defined by each of the electrodes 210 can be decreased effectively by the above design, so as to decrease the number of the sub-electrode 212 and reduce the complexity of the circuit design. Moreover, the capacity usage of the substrate 202 can be effectively utilized through the electrodes 210 with different extending directions. However, the electrodes 210 with different extending directions in FIG. 5 are exemplary, and the extending direction may slant one or more of the edges of the substrate 202 in other embodiments.

Figures 6A, 6B:
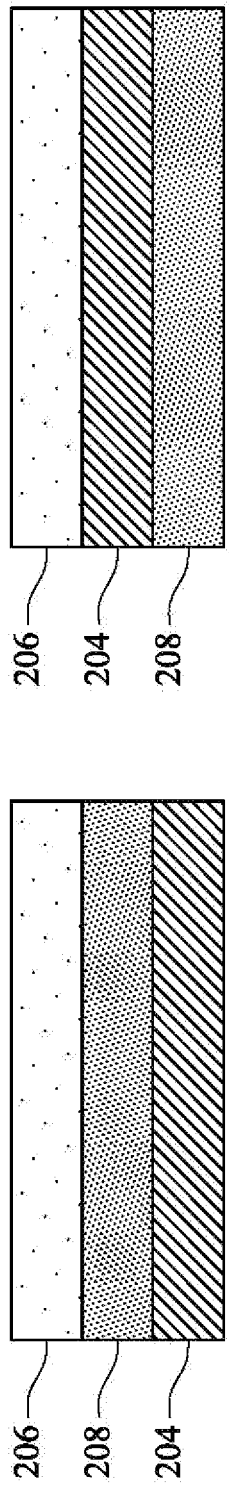
FIG. 6A is a schematic side view of a touch panel according to some embodiments of this disclosure.
FIG. 6B is a schematic side view of a touch panel according to the other some embodiments of this disclosure.

Since the touch panel of the present disclosure is designed as the single layer structure, the touch electrode structure can be combined with a color filter, as shown in FIG. 6A and FIG. 6B. FIG. 6A is a schematic side view of a touch panel according to various embodiments of this disclosure, and FIG. 6B is a schematic side view of a touch panel according to other embodiments of this disclosure.

The substrate of the touch panel 200 can be a color filter (CF) or a polarizing plate. In FIG. 6A, the touch electrode structure 208 is disposed between a color filter 204 and a polarizing plate 206. In FIG. 6B, the color filter 204 is disposed between the touch electrode structure 208 and the polarizing plate 206. In other words, the touch electrode structure 208 can be formed on the color filter 204 or the polarizing plate 206, and then the touch panel 200 is formed by combining the color filter 204 and the polarizing plate 206. That is, the touch electrode structure is integrated into a display device, so as to integrate the display module and the touch module into one apparatus.

In the touch electrode structure of the present disclosure, since each of the position units corresponds to a different combination of the sub-electrode units of the sub-electrodes, each of the position units has an individual and unique identity. That is, each of the position units uniquely corresponds to a different combination of the sub-electrode units of the sub-electrodes, and hence determining where the touch operation is performed can be achieved.

Therefore, in this configuration, since the number of the routes connecting to the electrodes and the controller is decreased, the area occupied by the routes is decreased and the touch panel can be suitable for the structure with the narrow frame. In addition, since the routes of the electrodes can be routed in two directions, the capacity usage of the substrate 202 can be utilized effectively.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this disclosure provided they fall within the scope of the following claims.

What is claimed is:

1. A touch electrode structure for defining a plurality of position units, comprising:
   a plurality of electrodes electrically insulated from each other, wherein:
      each of the plurality of electrodes comprises a plurality of sub-electrodes electrically insulated from each other, each of the plurality of sub-electrodes comprises a plurality of sub-electrode units that are comb-shaped and electrically connected to each other,
each of the plurality of position units is defined by two sub-electrode units,
the two sub-electrode units defining a position unit belong to different sub-electrodes of the plurality of sub-electrodes,
each position unit of the plurality of position units uniquely corresponds to a different combination of two sub-electrode units,
a first position unit of the plurality of position units comprises a first sub-electrode unit of a first sub-electrode of the plurality of sub-electrodes of a first electrode of the plurality of electrodes and a first sub-electrode unit of a second sub-electrode of the plurality of sub-electrodes of the first electrode,
a second position unit of the plurality of position units comprises a second sub-electrode unit of the first sub-electrode of the plurality of sub-electrodes of the first electrode and a first sub-electrode unit of a third sub-electrode of the plurality of sub-electrodes of the first electrode,
a third position unit of the plurality of position units comprises a second sub-electrode unit of the second sub-electrode of the plurality of sub-electrodes of the first electrode and a second sub-electrode unit of the first sub-electrode of the plurality of sub-electrodes of the first electrode, and
a fourth position unit of the plurality of position units comprises a third sub-electrode unit of the third sub-electrode of the plurality of sub-electrodes of the first electrode and a first sub-electrode unit of a fourth sub-electrode of the plurality of sub-electrodes of the first electrode.

2. The touch electrode structure of claim 1, wherein each of the plurality of electrodes and each of the plurality of sub-electrodes of each of the plurality of electrodes extend along a first direction.

3. The touch electrode structure of claim 2, wherein the two sub-electrode units in each of the plurality of position units extend along a second direction orthogonal to the first direction.

4. The touch electrode structure of claim 1, further comprising a plurality of electrode zones, wherein:
each of the plurality of electrode zones covers a subset of the plurality of electrodes, and
a first subset in a first electrode zone of the plurality of electrode zones extends along a different direction than a second subset in a second electrode zone of the plurality of electrode zones.

5. The touch electrode structure of claim 1, wherein the plurality of electrodes are parallel to each other.

6. The touch electrode structure of claim 1, wherein the plurality of sub-electrodes do not intersect.

7. The touch electrode structure of claim 1, wherein an area of each of the plurality of position units is equal to a total area of the two sub-electrode units defining the position unit.

8. A touch panel, comprising:
a substrate, wherein a plurality of position units are defined on the substrate; and
at least one touch electrode structure disposed on the substrate, wherein:
the at least one touch electrode structure comprises a plurality of electrodes electrically insulated from each other,
each of the plurality of electrodes comprises at least three sub-electrodes electrically insulated from each other,
each of the at least three sub-electrodes comprises a plurality of sub-electrode units electrically connected to each other,
each of the plurality of position units is defined by two sub-electrode units, and
each position unit of the plurality of position units uniquely corresponds to a different combination of two sub-electrode units,
a first sub-electrode of the at least three sub-electrodes of a first electrode of the plurality of electrodes comprises two sub-electrode units,
a second sub-electrode of the at least three sub-electrodes of the first electrode comprises three sub-electrode units, and
a third sub-electrode of the at least three sub-electrodes of the first electrode comprises four sub-electrode units.

9. The touch panel of claim 8, wherein:
the touch panel comprises two touch electrode structures disposed on different regions of the substrate, and
the plurality of electrodes comprised within a first touch electrode structure of the two touch electrode structures extend along a direction that is different than a direction along which the plurality of electrodes comprised within a second touch electrode structure of the two touch electrode structures extends.

10. The touch panel of claim 8, wherein the substrate is glass.

11. The touch panel of claim 8, wherein:
the substrate is a color filter, and
the at least one touch electrode structure is disposed between a polarizing plate and the color filter or the color filter is disposed between the polarizing plate and the at least one touch electrode structure.

12. The touch panel of claim 8, wherein the substrate is a polarizing plate.

13. The touch panel of claim 8, wherein each of the plurality of electrodes and each of the at least three sub-electrodes of each of the plurality of electrodes extend along a first direction.

14. The touch panel of claim 13, wherein the sub-electrode units in each of the plurality of position units extend along a second direction orthogonal to the first direction.

15. The touch panel of claim 8, further comprising a plurality of electrode zones, wherein:
each of the plurality of electrode zones covers a subset of the plurality of electrodes, and
a first subset in a first electrode zone of the plurality of electrode zones extends along a different direction than a second subset in a second electrode zone of the plurality of electrode zones.

16. The touch panel of claim 8, wherein the plurality of electrodes are parallel to each other.

17. The touch panel of claim 8, wherein the at least three sub-electrodes do not intersect.

18. The touch panel of claim 8, wherein an area of each of the plurality of position units is equal to a total area of the two sub-electrodes units defining the position unit.

19. A touch electrode structure for defining a plurality of position units, comprising:
a plurality of electrodes electrically insulated from each other, wherein:

each of the plurality of electrodes comprises a plurality of sub-electrodes electrically insulated from each other,
each of the plurality of sub-electrodes comprises a plurality of sub-electrode units electrically connected to each other,
each of the plurality of position units is defined by two sub-electrode units,
each position unit of the plurality of position units uniquely corresponds to a different combination of the two sub-electrode units,
a first sub-electrode of the plurality of sub-electrodes of a first electrode of the plurality of electrodes comprises two sub-electrode units,
a second sub-electrode of the plurality of sub-electrodes of the first electrode comprises three sub-electrode units, and
a third sub-electrode of the plurality of sub-electrodes of the first electrode comprises four sub-electrode units.

20. The touch electrode structure of claim 19, further comprising a plurality of electrode zones, wherein:
each of the plurality of electrode zones covers a subset of the plurality of electrodes, and
a first subset in a first electrode zone of the plurality of electrode zones extends along a different direction than a second subset in a second electrode zone of the plurality of electrode zones.

* * * * *